United States Patent
Zhang

(12) 
(10) Patent No.: US 10,082,092 B2
(45) Date of Patent: Sep. 25, 2018

(54) METHOD AND SYSTEM FOR VACUUM GENERATION USING A THROTTLE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 759 days.

(21) Appl. No.: 14/244,217

(22) Filed: Apr. 3, 2014

(65) Prior Publication Data

US 2015/0285160 A1    Oct. 8, 2015

(51) Int. Cl.

| F02M 51/00 | (2006.01) |
|---|---|
| F02D 9/08 | (2006.01) |
| F02D 9/10 | (2006.01) |
| F02D 41/00 | (2006.01) |
| F02M 35/10 | (2006.01) |
| F02D 11/10 | (2006.01) |
| F02D 13/02 | (2006.01) |
| F02D 9/02 | (2006.01) |
| F02M 26/05 | (2016.01) |

(52) U.S. Cl.
CPC .............. *F02D 9/08* (2013.01); *F02D 9/1005* (2013.01); *F02D 41/0002* (2013.01); *F02D 41/0055* (2013.01); *F02M 35/10229* (2013.01); F02D 11/10 (2013.01); F02D 13/0207 (2013.01); F02D 2009/024 (2013.01); F02D 2250/41 (2013.01); F02M 26/05 (2016.02); Y02T 10/42 (2013.01); Y02T 10/47 (2013.01)

(58) Field of Classification Search
USPC .......................................... 123/337; 60/602
See application file for complete search history.

(56) References Cited

U.S. PATENT DOCUMENTS

| 3,943,205 A * | 3/1976 | Oliver | F02M 1/04 |
|---|---|---|---|
| | | | 123/536 |
| 4,584,981 A | 4/1986 | Tanabe et al. | |
| 5,029,564 A * | 7/1991 | Neutzer | F02M 19/0228 |
| | | | 123/337 |
| 8,261,716 B2 | 9/2012 | Bergbauer et al. | |
| 8,353,266 B2 | 1/2013 | White et al. | |
| 2003/0230280 A1* | 12/2003 | Allston | F02D 9/08 |
| | | | 123/403 |

FOREIGN PATENT DOCUMENTS

| CN | 101216118 A | 7/2008 | |
|---|---|---|---|
| DE | 19612230 A1 * | 10/1997 | F02D 9/101 |

OTHER PUBLICATIONS

Machine Translation of DE19612230A1 PDF File Name: "DE19612230A1_Machine_Translation.pdf".*

* cited by examiner

*Primary Examiner* — Lindsay Low
*Assistant Examiner* — Ruben Picon-Feliciano
(74) *Attorney, Agent, or Firm* — Julia Voutyras; McCoy Russell LLP

(57) ABSTRACT

Various systems and methods are described for generating vacuum within an engine intake. An intake throttle including a hollow throttle plate having a plurality of perforations along its circumference is mounted on a hollow shaft, which in turn may be coupled to a vacuum consumption device. When vacuum is demanded by the vacuum consumption device, the opening of the throttle plate may be decreased and vacuum may be generated by flowing intake air past the perforated edge of the throttle plate.

20 Claims, 5 Drawing Sheets

METHOD AND SYSTEM FOR VACUUM GENERATION USING A THROTTLE

TECHNICAL FIELD

The present application relates to vacuum generation in an intake via a throttle plate.

BACKGROUND AND SUMMARY

Vehicle systems may include various vacuum consumption devices that are actuated using vacuum. These may include, for example, a brake booster and a purge canister. Vacuum used by these devices may be provided by a dedicated vacuum pump. In other embodiments, one or more aspirators (alternatively referred to as ejectors, venturi pumps, jet pumps, and eductors) may be coupled in the engine system that may harness engine airflow and use it to generate vacuum.

In yet another example embodiment shown by Bergbauer et al. in U.S. Pat. No. 8,261,716, a control bore is located in the wall of the intake such that when the throttle plate is at idle position, vacuum generated at the periphery of the throttle is used for a vacuum consumption device. Therein, the positioning of the throttle plate in an idle position provides a constriction at the throttle plate's periphery. The increasing flow of intake air through the constriction results in a venturi effect that generates a partial vacuum. The control bore is sited so as to utilize the partial vacuum for a vacuum consumption device.

The inventors herein have identified potential issues with the above approach. As an example, the vacuum generation potential of the throttle is limited. For example, a single control bore at one location in the intake, as shown in U.S. Pat. No. 8,261,716, is utilized by the vacuum consumption device even though vacuum may be generated at the entire periphery of the throttle. To use vacuum generated at the entire periphery of the throttle, more control bores may be needed in the intake passage. However, fabricating these control bores may result in significant modifications to the design of the intake passage which can increase related expenses.

In the approaches that use one or more aspirators to generate vacuum, additional expenses may be incurred because of individual parts that form the aspirator including nozzles, mixing and diffusion sections, and check valves. Further, at idle or low load conditions, it may be difficult to control the total air flow rate into the intake manifold since the flow rate is a combination of leakage flow from the throttle and airflow from the aspirator. Typically, an aspirator shut off valve (ASOV) may be included along with the aspirator to control airflow but with added cost. Further, installing aspirators in the intake can lead to constraints on space availability as well as packaging issues.

The inventors herein have identified an approach to at least partly address the above issues. In one example approach, a method is provided for an engine including a hollow intake throttle plate having a perforated edge. The method comprises adjusting a position of the hollow throttle plate with the perforated edge and generating vacuum via intake airflow past the perforated edge of the hollow throttle plate. The generated vacuum is then applied to a vacuum consumption device fluidly coupled to the hollow throttle plate via a hollow shaft. In this way, the throttle plate can function as an aspirator and supply vacuum to the vacuum consumption device.

As an example, an engine intake throttle may be configured as a hollow throttle plate mounted on a hollow shaft. The hollow shaft may fluidically couple the hollow space within the throttle plate to a vacuum consumption device. The throttle plate may further include a plurality of perforations around the periphery of the plate. The perforations may be dispersed uniformly or may be aggregated in specific locations along the edge of the throttle plate. When the vacuum demand of the vacuum consumption device coupled to the hollow throttle plate increases, the throttle plate may be adjusted to a more closed position. As a result, vacuum may be generated by the flow of intake air through a constriction created between the inside edge of the intake passage and the periphery of the throttle. This vacuum may be applied to the vacuum consumption device by flowing air from the vacuum consumption device through the hollow shaft into the hollow throttle plate and thereon, into intake airflow through the perforations at the edge of the hollow throttle plate. Once sufficient vacuum has been generated, the throttle position may be returned to a more open position.

In this way, a venturi flow passage created at the boundary of the hollow throttle plate in a more closed position can be advantageously used to generate vacuum for a vacuum consumption device. Perforations at the periphery of the throttle plate can be used to provide a channel to draw air or gas from the vacuum consumption device via the hollow shaft. By adjusting the location and size of perforations along the throttle periphery, vacuum can be generated over a larger portion of the throttle's periphery, such as over the entire periphery. As such, this improves the vacuum generation potential of the throttle plate. In addition, airflow into the intake manifold can be better controlled by adjusting the distance between the inside of the intake passage and the edge of the throttle plate. Furthermore, since air received from the vacuum consumption device during vacuum application is received substantially at the throttle plate, airflow errors can be better compensated for. By combining the functions of a throttle and an aspirator into a single hollow throttle plate with a perforated edge and a hollow shaft, additional control valves, such as an ASOV, and parts may not be needed. Further, the vacuum generation ability of the throttle is improved without requiring significant modifications to the intake passage. By reducing the number and size of components required for vacuum generation, manufacturing expenses may be lowered and packaging issues may be averted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
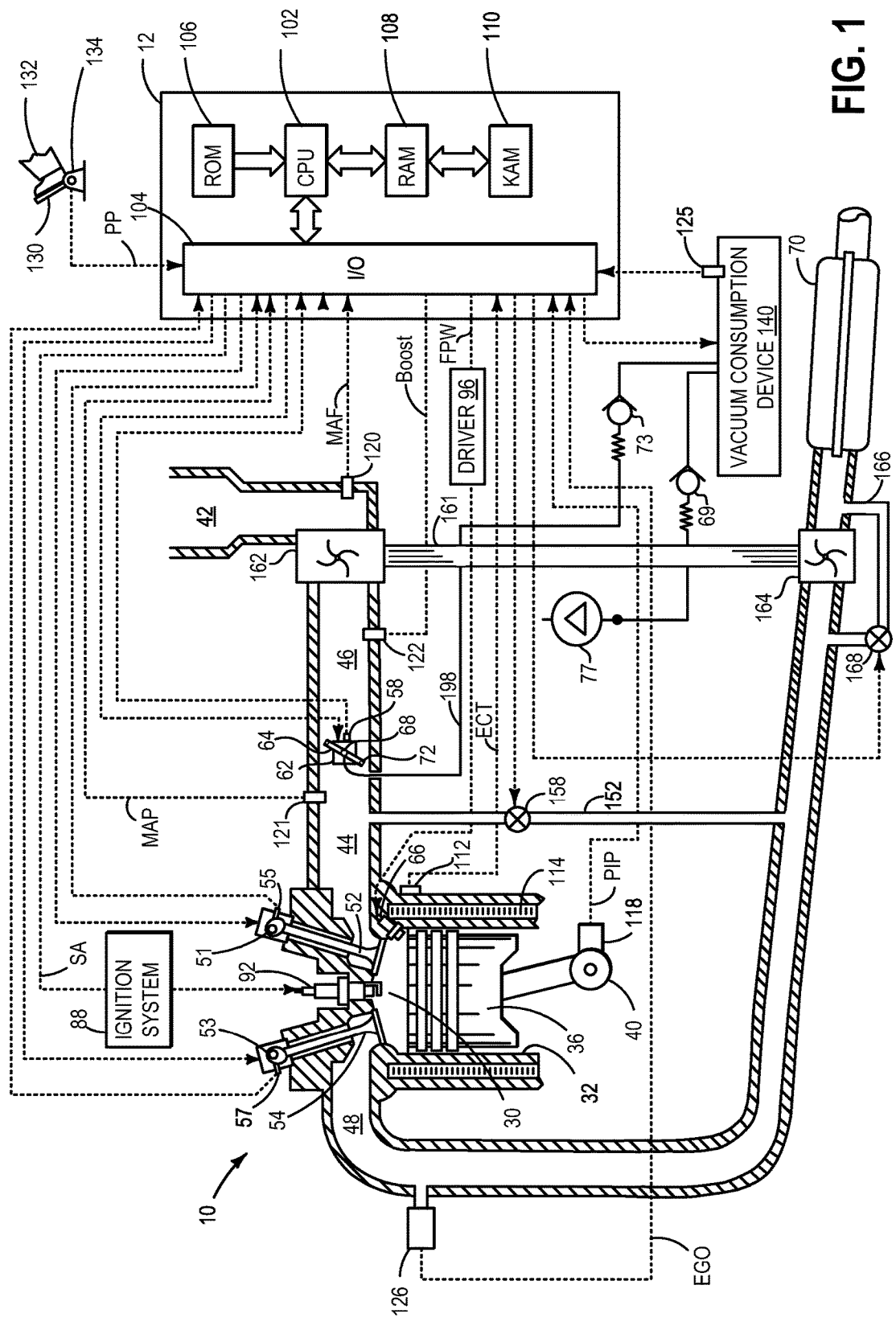
FIG. 1 portrays a schematic diagram of an engine in accordance with the present disclosure.
Figure 2:
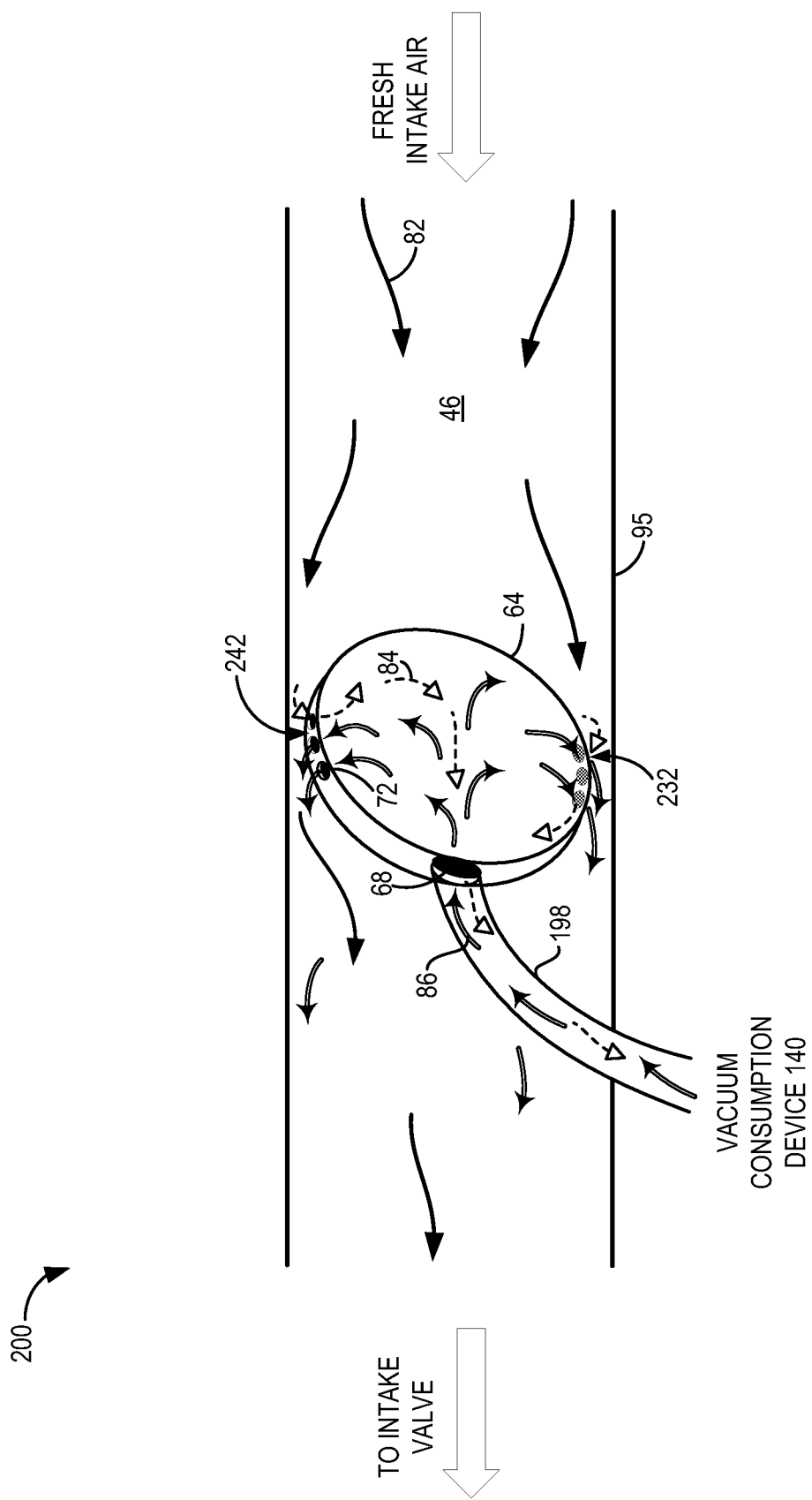
FIG. 2 depicts an example embodiment of a hollow intake throttle plate with perforations.
Figure 3:
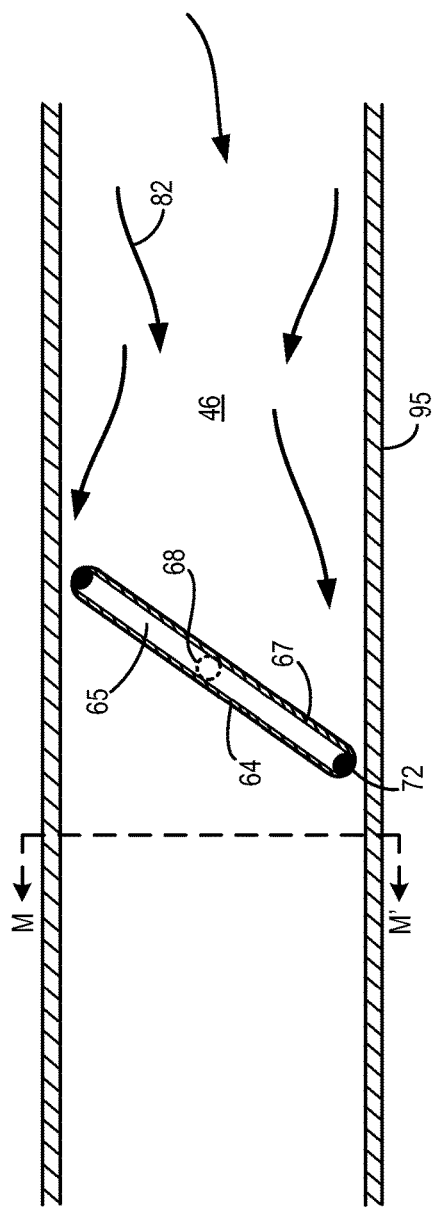
FIG. 3 is a schematic illustration of the hollow throttle plate of FIG. 2 within the intake passage.
Figure 4:
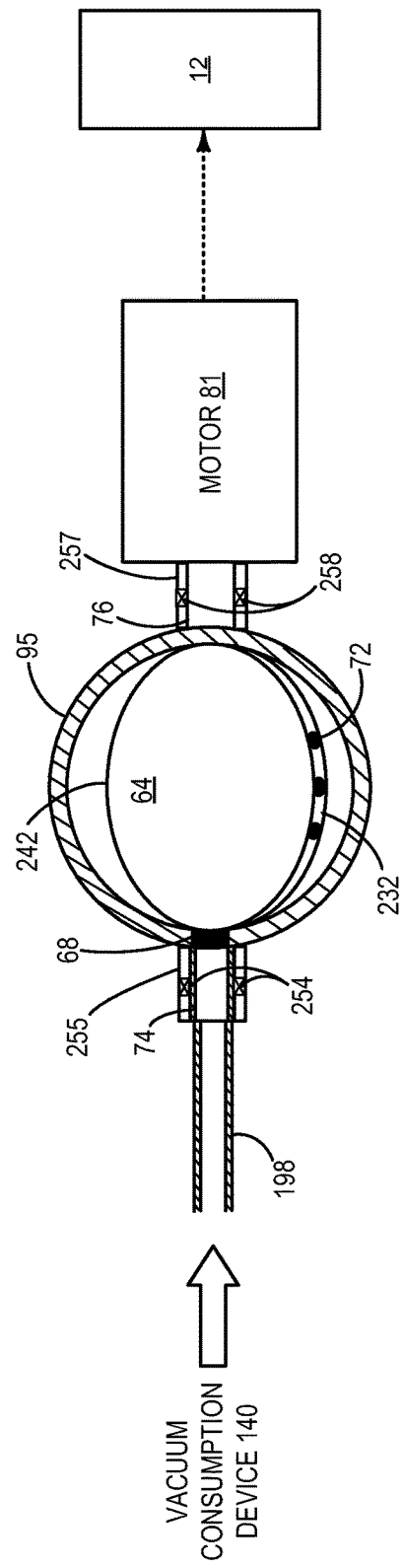
FIG. 4 shows a cross-section of the intake passage of FIG. 3 to depict an alternate view of the hollow throttle plate.
Figure 5:
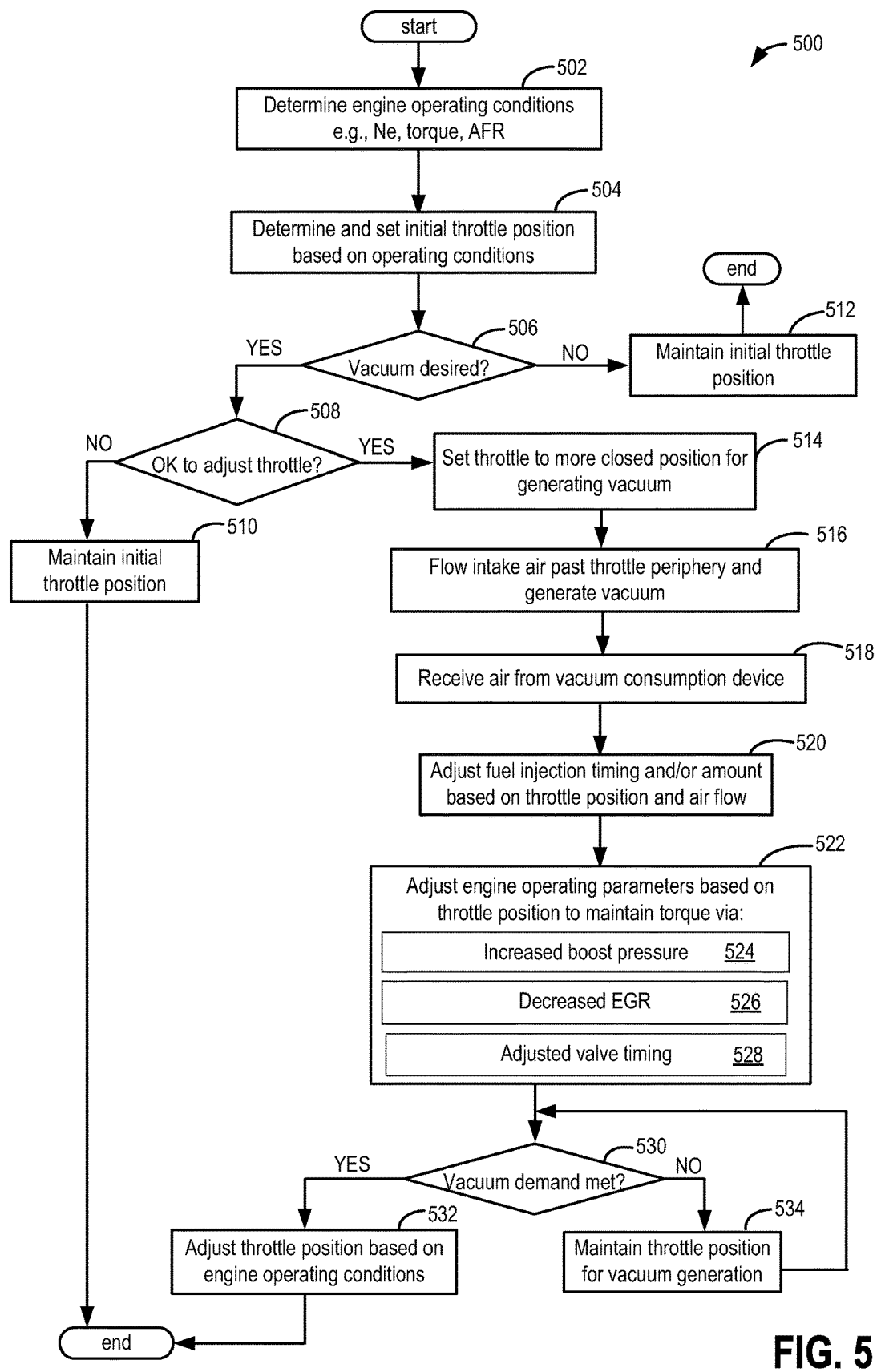
FIG. 5 is a flowchart illustrating an example method for adjusting throttle position and engine operating parameters.

Methods and systems are described for generating vacuum within an intake passage in an engine, such as the engine system shown in FIG. 1. The intake passage may be provided with an intake throttle comprising a hollow throttle plate with a perforated edge coupled to a vacuum consumption device via a hollow shaft, as shown in FIGS. 2-4. A controller may be configured to perform a routine to modify a throttle position based on vacuum demand from the vacuum consumption device (FIG. 5). Various operating parameters may be adjusted (FIG. 6), as throttle position is varied, to maintain engine torque.

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 96. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake passage 42. For a turbocharger, compressor 162 may be at least partially driven by a turbine 164 (e.g. via a shaft) arranged along exhaust passage 48. Compressor 162 draws air from intake passage 42 to supply boost chamber 46. Exhaust gases spin turbine 164 which is coupled to compressor 162 via shaft 161. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

A wastegate 168 may be coupled across turbine 164 in a turbocharger. Specifically, wastegate 168 may be included in a bypass 166 coupled between an inlet and outlet of the exhaust turbine 164. By adjusting a position of wastegate 168, an amount of boost provided by the turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. As elaborated at FIG. 2-4, throttle plate 64 may be hollow within and may include an opening 68 which fluidically couples the throttle with vacuum consumption device 140. Throttle 62 may control airflow from intake boost chamber 46 to intake manifold 44 and combustion chamber 30 among other engine cylinders. The position of throttle plate 64 may be provided to controller 12 by throttle position signal TP from throttle position sensor 58.

Engine 10 is coupled to vacuum consumption device 140 which may include, as non-limiting examples, one of a brake booster, a fuel vapor canister, and a vacuum-actuated valve (such as a vacuum-actuated wastegate). Vacuum consumption device 140 may receive vacuum from a plurality of vacuum sources. One source may be vacuum pump 77 that may be selectively operated via a control signal from controller 12 to supply vacuum to vacuum consumption device 140. Check valve 69 allows air to flow to vacuum pump 77 from vacuum consumption device 140 and limits airflow to vacuum consumption device 140 from vacuum pump 77. Another source of vacuum may be throttle plate 64 which is positioned within boost chamber 46. Throttle plate 64 is hollow and has multiple perforations 72 at its periphery. As shown in FIG. 1, an opening 68 within throttle plate 64 may be connected to vacuum consumption device 140 via a hollow shaft mounted on bearings (not shown) and coupled to a conduit 198. When throttle plate 64 is in a mostly closed or a fully closed position, vacuum may be generated at the periphery of throttle plate 64 as intake air flows past the edge. This vacuum may draw air from vacuum consumption device 140 through conduit 198, via the hollow shaft into opening 68 of hollow throttle plate 64. This air may then flow out of perforations 72 at the periphery of throttle plate 64. Check valve 73 ensures that air flows from vacuum consumption device 140 to hollow throttle plate 64 and thereon into intake manifold 44 and not from intake manifold 44 to vacuum consumption device 140.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

An exhaust gas recirculation (EGR) system may be used to route a desired portion of exhaust gas from exhaust passage 48 to intake manifold 44 through conduit 152 via EGR valve 158. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, EGR valve 158 and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a measurement of vacuum in vacuum consumption device 140 from pressure sensor 125, a profile ignition pickup signal (PIP) from Hall effect sensor 118 (or other type) coupled to crankshaft 40; a measurement of air mass entering the engine from mass airflow sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

FIG. 2 illustrates a schematic diagram of an embodiment 200 of a hollow throttle plate, coupled to a vacuum consumption device that may be included in the intake of engine 10 of FIG. 1. As such, components previously introduced in FIG. 1 are numbered similarly in FIG. 2 and not reintroduced.

Throttle plate 64 is shown positioned within boost chamber 46 of an intake as fresh intake air 82 flows through intake conduit 95. Vacuum consumption device 140 is fluidly coupled via conduit 198 to a hollow shaft (not shown), which in turn is connected to opening 68 of throttle plate 64. The hollow shaft may be mounted on bearings coupled to an inner surface of intake conduit 95. Throttle plate 64 is hollow and includes a plurality of perforations 72 at its periphery. That is, the plurality of perforations may be arranged along a circumference of the throttle plate. In one example, the perforations may have a diameter that is less than the width of the throttle plate. In an alternate example, where the throttle is shaped such that it narrows when going from the center of the throttle towards the edge (that is, a width of the throttle plate at the center is wider than a width of the throttle plate at the edge), the perforations may have a diameter based on the width of the throttle at the edge. Further, the perforations may be distributed uniformly along the periphery of the throttle plate. Alternatively, the perforations may be distributed non-uniformly, as depicted.

In the given example, the perforations are clustered at two diametrically opposite locations along the edge of the throttle plate. Specifically, in the example shown, a first group of perforations 72 are located at a first location at a top edge 242 and a second group of perforations are located at a second location, diametrically opposite the first location, at a bottom edge 232 of throttle plate 64. In the depicted example, each group includes three perforations, as shown in FIG. 2. However, in alternate embodiments, each group or cluster may include a larger or smaller number of perforations. In other embodiments, the size, location and number of perforations may be different from the example shown herein. For example, the perforations may be smaller in diameter, the perforations may be clustered at multiple locations along the edge of the throttle plate, etc. The size and location of perforations 72 may be optimized by using a model, such as a computational fluid dynamics (CFD) tool, to enable a higher airflow rate from the vacuum consumption device 140. Additionally, the edge surface of throttle plate 64 may be designed to create a low static pressure when throttle plate 64 is in a partially closed, mostly closed, or fully closed position.

When vacuum consumption device 140 demands vacuum, and engine conditions permit, throttle plate 64 may be adjusted by the controller to a more closed position within boost chamber 46. With throttle plate 64 situated in a more closed position, a constricted passage may be created between the inside edge of intake conduit 95 and the periphery of throttle plate 64. In the example of FIG. 2, constricted passages may be created between top edge 242 and the top inside of intake conduit 95, and bottom edge 232 of throttle plate and the bottom inside edge of intake conduit 95. As intake air 82 flows through these constricted passages, a venturi effect is created, and vacuum 84 may be generated within these constricted passages. Specifically, intake airflow velocity may reach a higher value in these constricted passages while local static pressure may reach a lower value producing a vacuum 84 at or near the location of the perforations 72. When the vacuum 84 is applied to the vacuum consumption device, air 86 is drawn from the vacuum consumption device 140 via conduit 198, and then through hollow throttle plate 64 and then out of perforations 72 into intake air 82 flowing past throttle plate 64.

Turning now to FIGS. 3 and 4, they show throttle plate 64 and its arrangement in the intake conduit 95 in more detail. FIG. 3 is a schematic diagram of boost chamber 46 with throttle plate 64 positioned within and viewed from the side of intake conduit 95. FIG. 4 is a cross sectional view of boost chamber 46 within intake conduit 95, in a cross sectional plane along line M-M' of FIG. 3. In the depicted example, throttle plate 64 is situated within intake conduit 95 and leaning away from the viewer such that bottom edge 232 is lifted towards the viewer. Note that components previously introduced in FIG. 1 and FIG. 2 are numbered similarly in FIGS. 3 and 4, and not reintroduced.

Throttle plate 64 is positioned in the examples of FIG. 3 and FIG. 4 in a more closed position within intake conduit 95 and boost chamber 46. The depicted more closed position enables more vacuum generation. A hollow region 65 is enclosed within walls 67 of throttle plate 64 and perforations 72 are located at the edges of throttle plate 64. FIG. 4 depicts the placement of perforations 72 along the bottom edge 232 of throttle plate 64. As shown in FIG. 4, a group of three perforations are clustered at the bottom edge 232 of throttle plate 64. A similar group of three perforations may be located on top edge 242 of throttle plate 64. In alternate embodiments, the perforations may be spread uniformly around the periphery of the throttle plate. Further, the size, location and number of perforations may be different from the example shown herein. Vacuum consumption device 140 is connected via conduit 198, and hollow shaft 74 to opening 68 of throttle plate 64. Hollow shaft 74 may be fluidly coupled to conduit 198 in a longitudinal manner.

A position of throttle plate 64 may be adjusted by motor 81 that is connected to throttle plate 64 via shaft 76. Shaft 76 may not be hollow. Throttle plate 64 may be mounted on hollow shaft 74 and shaft 76 such that shafts 74 and 76 are perpendicular to the edge of the throttle plate. Further, throttle plate 64 may be joined to shaft 76 and hollow shaft 74 at its edge via one or more of various joining methods including welding, adhesion and fastening. Other joining methods not listed herein may also be used. Throttle plate 64 may in turn be fitted within a throttle body (not shown). Each of the shafts, 74 and 76, may be mounted on respective bearings 254 and 258 which may be bolted to their respective housings 255 and 257. Thus, as throttle plate 64 is rotated to different throttle angles within intake conduit 95, shafts 74 and 76 may spin supported by respective bearings 254 and 258. Motor 81 may be powered by a system battery and may receive operating commands from controller 12 to adjust the position of hollow throttle plate 64 via shaft 76 based on engine conditions. By varying a position of shaft 76, motor 81 may adjust an opening and closing of throttle plate 64.

Thus, in one example, throttle plate 64 may be adjusted by motor 81 to a more closed position in response to an increase in vacuum demand at the vacuum consumption device 140. As intake air 82 flows past perforations 72 of throttle plate edges 242 and 232, vacuum may be generated herein. This vacuum may be applied to vacuum consumption device 140 by flowing air from vacuum consumption device 140 through conduit 198, via hollow shaft 74 past opening 68 and into hollow region 65 enclosed within throttle plate 64. Air drawn from vacuum consumption device 140 may then be streamed through perforations 72 of the perforated edge of hollow throttle plate 64 into intake airflow, e.g. intake air 82, towards the intake valve of cylinder 30.

Turning now to FIG. 5, it shows an example routine 500 that a controller may perform to adjust a hollow throttle plate (herein, also termed throttle) position in response to vacuum demand from a vacuum consumption device coupled to the throttle plate. Additionally, the controller may modify one or more engine operating parameters responsive to the adjusting of the throttle plate in order to maintain engine torque.

At 502, engine operating conditions may be determined. Engine operating conditions may include engine speed, torque demand, combustion air-fuel ratio, boost pressure, manifold absolute pressure, mass airflow, engine temperature, etc. Once engine operating conditions are estimated, at 504, an initial throttle position may be determined and set based on these engine operating conditions. For example, as the operator torque demand increases, the throttle may be moved to a more open position to increase intake airflow. As another example, if combustion air-fuel ratio is determined to be leaner than a desired stoichiometric value, the throttle may be set to a more closed position to reduce intake airflow. In yet another example, if engine idling conditions are met, the throttle may be moved to a fully closed position.

At 506, routine 500 may determine if vacuum is desired by a vacuum consumption device coupled to the throttle. In one example, vacuum may be demanded when the vacuum consumption device is actuated. In another example, if the vacuum consumption device includes a vacuum reservoir, it may be determined if the vacuum requirement of the device exceeds the vacuum available in the reservoir. If it is determined that vacuum is not desired, at 512, the initial throttle position may be maintained and the routine ends. The throttle position may then continue to be adjusted based on engine operating conditions only, and not based on vacuum requirement of the vacuum consumption device.

On the other hand, if it is determined that the vacuum consumption device requires vacuum assistance, at 508, routine 500 may assess whether engine conditions allow a change in throttle position. In particular, it may be determined if the engine conditions permit a change in the throttle position towards a more closed position where intake airflow to the engine is reduced. As such, there may be engine conditions where changes in throttle position may be tolerated without affecting engine performance. In addition, there may be conditions where the throttle position is limited or constrained. For example, if the vehicle is accelerating on a highway and engine speed is higher than a threshold, the throttle may be positioned in a mostly open or fully open position to allow higher airflow. In this situation, the throttle position may not be moved to a more closed position for generating vacuum as it would adversely affect engine torque output and performance. Thus, if it determined that the position of the throttle cannot be adjusted, at 510, the controller maintains the throttle at its initial position and the routine ends. The throttle position may then continue to be adjusted based on engine operating conditions only, and not based on the vacuum requirement of the vacuum consumption device.

However, if it is assessed that engine conditions permit a change in throttle position, and more specifically the conditions permit a decrease in throttle position, at 514, the throttle may be moved towards a more closed position than the initial position. The adjustment to the position of the throttle may depend on the level of vacuum desired by the vacuum consumption device. For example, if a higher level of vacuum is desired, the throttle may be moved further towards a fully closed position (e.g., the throttle may be fully closed). On the other hand, if a lower level of vacuum is desired, the controller may adjust the throttle to a slightly closed or partially closed position. Thus, as the level of desired vacuum from the vacuum consumption device increases, the throttle may be moved towards a more closed position. In one example, if it is determined at 508 that the throttle is already in a closed position during engine idling, the throttle position may be retained, at 514, without further adjustments.

Next, at 516, vacuum may be generated at the throttle plate as intake air flows past the periphery of the throttle. As elaborated previously, a venturi effect may be created by the flow of intake air through a constricted passage created between the throttle plate and the inside surface of the intake conduit, and vacuum may be generated within the constricted passage. At 518, the generated vacuum may be applied to the vacuum consumption device to enable the device to be actuated or operated. For example, where the vacuum consumption device is a brake booster, the generated vacuum may be applied to enable wheel braking. As another example, where the vacuum consumption device is a fuel vapor canister, the generated vacuum may be applied to enable canister purging to the engine intake. As yet another example, where the vacuum consumption device is a vacuum actuated valve, the generated vacuum may be applied to enable valve actuation. As vacuum is applied to the vacuum consumption device, air is received from the vacuum consumption device at the throttle plate. As described earlier, air may flow from the vacuum consumption device, through a conduit coupled to a hollow shaft of the hollow throttle plate and out through the perforations on the circumference of the throttle plate into the intake. Thus, the air from the vacuum consumption device is received at the throttle, facilitating air flow control.

At 520, one or both of fuel injection amount and injection timing may be adjusted based on the throttle position, and existing airflow, to maintain engine torque. Existing airflow may be a combination of fresh intake air that flows past the perforated edge of the throttle and air flowing from the vacuum consumption device through the hollow throttle plate into the intake. In one example, the fuel injection amount and/or timing may be adjusted to maintain a cylinder air-fuel ratio at or close to a desired ratio, such as stoichiometry. In another example, fuel injection amount and/or timing may be modified to maintain engine combustion for torque. In yet another example, one or both of fuel injection timing and fuel injection amount may be varied to maintain each of engine torque and a stoichiometric air fuel ratio.

In one example, during engine idling conditions, as the throttle is adjusted to a fully closed position, airflow via the throttle is reduced while airflow from the vacuum consumption device into the intake manifold is increased. Based on the total airflow being smaller, a fuel injection amount may be decreased to maintain air-fuel ratio. The fuel injection amount may be reduced by decreasing a pulse width of the fuel injection. Further, fuel injection timing may be advanced or retarded based on engine torque requirement.

At 522, one or more engine operating parameters may be varied in response to the adjustment of throttle position and the flowing of air from the vacuum consumption device. Engine operating parameters may be modified to maintain engine torque output. For example, boost pressure may be increased at 524 as the hollow throttle plate is moved to a more closed position at 514. To increase boost pressure, a wastegate coupled across an exhaust turbine may be adjusted to a less open position to allow a larger quantity of exhaust gases to flow past the exhaust turbine. By increasing boost pressure in the boost chamber within the intake, a drop in engine torque resulting from the throttle closing can be compensated for.

Engine torque output may also be maintained by decreasing a rate of exhaust gas recirculation (EGR) at 526. As the throttle is moved to a more closed position, an EGR valve in an EGR passage coupling the engine exhaust to the engine intake may be adjusted to a more closed position to allow a smaller proportion of exhaust gases to be recirculated into the intake. Thus, by reducing the flow of exhaust residuals into the intake, engine dilution is reduced, and the aircharge within engine cylinders may comprise a larger proportion of fresh intake air allowing the engine to maintain its torque output.

At 528, valve timing may be adjusted to retain engine torque levels. In one example, the intake valve may be held open for a longer duration to allow more fresh air into the cylinder. In another example, exhaust valve timing may be modified to reduce the proportion of internal EGR within the cylinder. Further still, each of intake an exhaust valve timing may be adjusted to vary an amount of valve overlap. For example, valve overlap may be reduced to improve engine torque output.

It will be appreciated that the controller may select one or more of the various engine operating parameters described above to maintain torque based on existing operating conditions. For example, during a first condition, where the vehicle is operating under steady state driving conditions when the throttle position is modified to generate vacuum, the controller may only increase boost pressure but not reduce EGR to maintain engine torque output. During a second condition, as the throttle is closed, boost pressure may be maintained while EGR dilution is reduced. In another example, during a third condition, each of internal and external EGR reduction may be used. For example, an exhaust valve may be closed relatively early to reduce internal EGR within the cylinder and an opening of the EGR valve for external EGR may be decreased simultaneously to reduce external EGR into the intake. During a fourth condition, as the throttle position is closed, the controller may reduce EGR while also increasing boost pressure. Still other combinations may be possible.

Next at 530, routine 500 may confirm that sufficient vacuum has been generated to meet the demand of the vacuum consumption device. If it is determined that the demand has not been met, at 534, the throttle position set at 514 may be maintained and vacuum may continue to be generated for a longer duration. In another example, if the throttle is not fully closed at 514, the throttle may be moved to a fully closed position to generate more vacuum, if engine operating conditions allow this adjustment. Routine 500 may then return to 530 to determine if vacuum demand has been met.

If it is determined that sufficient vacuum has been generated for the vacuum consumption device, at 532, the throttle may be adjusted back to its initial position. Alternatively, the throttle may be moved to a position based only on the existing engine operating conditions.

In this way, a position of the hollow throttle may be adjusted by the controller in response to a vacuum demand from the vacuum consumption device. As the demand for vacuum from the vacuum consumption device increases, the throttle may be moved to a more closed position. Further, changes in engine torque that occur from the decrease in throttle opening and the flowing of air from the vacuum consumption device may be counteracted by varying one or more of engine operating parameters such as boost pressure, valve timing and EGR. Thus, boost pressure may be increased, EGR flow may be reduced and valve timings may be altered to maintain engine torque output. Further, one or both of fuel injection amount and injection timing may be modified to maintain engine combustion at or around stoichiometry.

Figure 6:
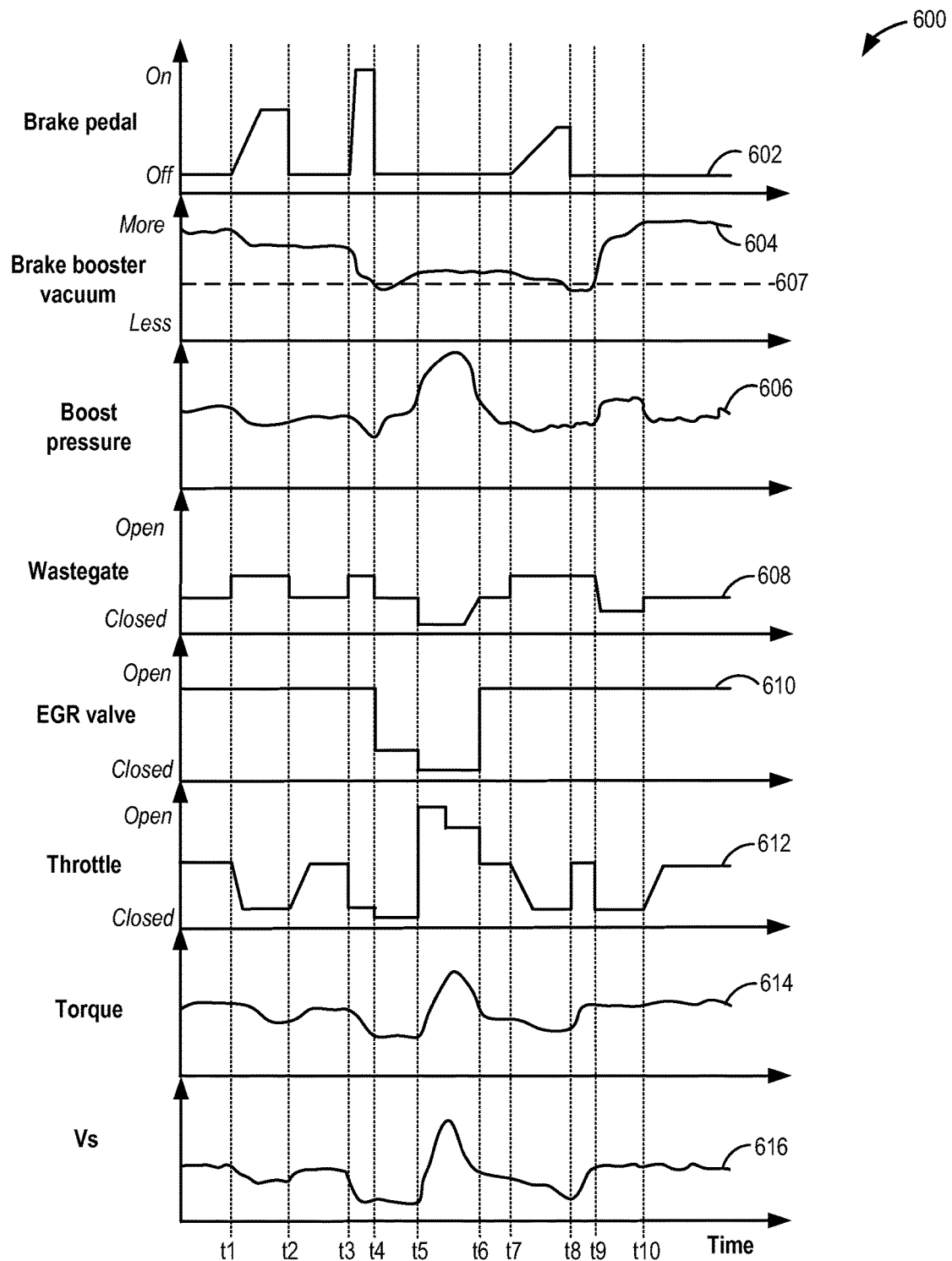
FIG. 6 portrays an example throttle position adjustment to improve vacuum generation with concurrent engine operating parameter adjustments to maintain engine torque, according to the present disclosure.

Turning now to FIG. 6, it illustrates map 600 depicting an example intake throttle position adjustment based on a demand for vacuum from a brake booster and modifications in engine operating parameters in response to the throttle position adjustment. Map 600 shows brake pedal position at plot 602, brake booster vacuum level at plot 604, boost pressure at plot 606, a wastegate position at 608, EGR valve position at plot 610, throttle position at plot 612, engine torque output at plot 614, and vehicle speed, Vs, at plot 614. All the above are plotted against time on the X-axis. Line 607 represents a minimum threshold vacuum in the brake booster reservoir.

Prior to time t1, a vehicle may be moving in a steady state condition with moderate speed. The throttle may be at a partly open position to allow adequate airflow into the intake, the throttle opening based on the operating conditions such as the vehicle speed and the operator demanded torque. Further, engine torque output and boost pressure may be adjusted to moderate levels based on the operating conditions. In the depicted example, the engine is operating with the wastegate at a mostly closed position to provide the demanded boost pressure. Brake pedal is in a released (or "off") position and vacuum in the brake booster reservoir is sufficient, as indicated by the brake booster vacuum being higher than vacuum threshold 607. In addition, prior to t1, based on engine operating conditions such as engine speed and load conditions, the EGR valve may be held in a more open position to permit a higher flow of exhaust residuals into the intake, to improve engine fuel economy and reduce NOx emissions.

At t1, the brake pedal may be applied by the operator upon which vacuum in the brake booster reservoir is consumed to enable wheel braking. As brake application continues, the quantity of vacuum in the reservoir reduces. However, the level of vacuum within the reservoir remains above threshold 607. Due to brake application, engine torque output and vehicle speed decrease. In addition, to reduce the engine torque output and vehicle speed, the throttle may be adjusted to a more closed position. The wastegate may also be moved to a more open position to enable boost pressure to be reduced.

At t2, the brake pedal is released and the vehicle resumes steady state travel conditions similar to those prior to t1. Based on the prevalent operating conditions, the throttle is moved towards a more open position to increase engine torque output. In addition, boost pressure is increased by moving the wastegate to a more closed position. As a result, vehicle speed may increase.

At t3, the brake pedal may be applied again. Brake pedal application at t3 may be more forceful (e.g., depressed further and faster) as compared to the brake pedal application at t1. As a result, a steeper drop in vacuum levels within the brake booster reservoir is observed. In particular, the harder brake pedal application at t3 may result in vacuum depletion to below threshold level 607 at the reservoir. As the brakes are applied, between t3 and t4, vehicle speed and engine torque output fall sharply. The throttle may be moved to a more closed position and the wastegate may be moved to a more open position, to reduce boost pressure and engine output. Serendipitously, the throttle closing also enables vacuum to be produced at the throttle, which may be applied to the brake booster during the brake application. In particular, as the throttle is moved to the more closed (e.g., fully closed) position, air flowing past the constriction between the throttle and the intake passage results in a venturi effect and vacuum is generated at the perforated edge of the throttle plate.

At t4, the brake booster vacuum level falls below threshold 607. In response to drop, a demand for additional vacuum may be received by the controller. The brakes may be released at t4 and the vehicle may travel at a slower speed between t4 and t5. However, due to the vacuum demand, the throttle may be adjusted to a fully closed position and may be maintained at the closed position to generate vacuum via intake airflow past the perforated edge of the hollow throttle plate. The generated vacuum is applied to the brake booster until vacuum in the brake booster reservoir is above threshold 607. In an alternate example, the controller may maintain the throttle at the more closed position existing before t4 until the vacuum level in the reservoir is above the threshold. Between t4 and t5, the vacuum level in the reservoir may rise towards threshold 607, and the throttle may be moved to a nominal open position based on existing engine operating conditions. While the throttle is held closed for vacuum generation, the wastegate may be moved to a more closed position to increase boost pressure and prevent a decrease in engine torque output. Additionally, the EGR valve may be adjusted to a more closed position to reduce the flow of exhaust gas residuals into the intake and assist in maintaining engine torque.

At t5, while vacuum is being generated at the throttle, the operator may apply an accelerator pedal to sharply increase vehicle speed. For example, the operator may be accelerating on a highway to pass other vehicles and may fully depress the accelerator pedal. In response to accelerator pedal application (not shown), the throttle may be moved to a fully open position, also termed a wide open throttle position, to allow maximum airflow into the intake and into the cylinders. Thus, in response to an elevated torque request being received while the throttle was held at the more closed position for vacuum generation, the throttle may be opened and further vacuum generation may be aborted until engine conditions permit reclosing of the throttle. Due to throttle opening, vacuum levels within the brake booster reservoir remain at or around threshold 607 beyond t5. The EGR valve may be fully closed during wide open throttle conditions to reduce engine dilution and improve engine torque output. Simultaneously, the wastegate may also be moved to a fully closed position so that boost pressure can be increased rapidly, enabling a significant increase in engine torque. Between t5 and t6, the vehicle speed may rise sharply in response to the accelerator pedal application, and then as the accelerator pedal is gradually released, the vehicle speed may fall at or around t6. Engine torque and boost pressure may follow a similar path and the throttle may be moved from a fully open position to a partly open position at t6 based on existing operating conditions. Between t6 and t7, the vehicle may travel at steady state conditions wherein the vehicle speed, torque, and boost pressure return to levels prior to t1. Further, the EGR valve and the wastegate are returned to nominal positions where EGR valve is more open and the wastegate is more closed.

At t7, the brake pedal may be applied with less force than brake pedal application at t1 or t3. Thus, vacuum in the brake booster reservoir may be consumed to a lesser extent. However, since the vacuum levels within the reservoir are just at or around threshold 607, the application of brakes at t7 results in vacuum levels decreasing below threshold 607 between t7 and t8. As the brakes are applied, vehicle speed and engine torque reduce and the throttle may be moved to a more closed position. In addition, the throttle may be held at the more closed position so that vacuum can be generated for brake application. The EGR valve stays in its mostly open position while boost pressure may decrease slightly as the wastegate is opened slightly.

At t8, the brake pedal may be released and the throttle may be moved to a partly open position. Thus between t8 and t9, engine torque may rise and vehicle speed may increase. At t9, since steady state driving conditions may exist, and the vacuum levels are below threshold 607, the controller may move the throttle to a mostly closed position to generate vacuum. Between t9 and t10, therefore, vacuum levels within the brake booster reservoir increase steadily until adequate vacuum levels are achieved at t10. To prevent a reduction in engine torque between t9 and t10 as the throttle is moved to a more closed position, boost pressure may be increased by moving the wastegate to a more closed position at t9. The controller may decide to use boost pressure alone and not reduce EGR levels for maintaining engine torque output. Therefore, the EGR valve is retained at a mostly open position.

At t9, vacuum demand is met and the throttle may be returned to a partly open position. Simultaneously, the wastegate may be moved to a more open position and boost pressure may reduce to a level similar to that prior to t1.

In this way, a hollow throttle plate configured with multiple perforations along its circumference may be positioned in an engine intake passage to generate vacuum from intake airflow when adjusted to a more closed position. The throttle plate may be mounted on a hollow shaft that connects the hollow throttle plate to a vacuum consumption device. In response to vacuum demand from the vacuum consumption device, the position of the hollow throttle plate may be adjusted to a more closed position to increase vacuum generation as the demand for vacuum increases. As the opening of the throttle plate within the engine intake is decreased, engine torque output may be sustained by modifying one or more of boost pressure, EGR flow and valve timing.

In another representation, a method for an engine may comprise adjusting a position of a hollow throttle plate with a perforated edge to generate a vacuum within the throttle plate positioned inside an intake of the engine and a gas from outside the engine may be drawn through the perforations via the vacuum and into intake airflow flowing past the perforated edge.

In this way, the functions of an aspirator may be combined with those of a throttle enabling a reduction in packaging space. Additionally, by removing the need for a separate aspirator, expenses may be reduced. Total airflow rate into the intake manifold at engine idle and low load conditions may be controlled in a simpler manner by adjusting the minimal distance between the inside edge of the intake conduit and the throttle plate edge. Thus, an extra aspirator shut off valve to control aspirator flow rate into the intake may be avoided enabling a further savings in costs.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
responsive to an increase in vacuum demand,
adjusting a hollow throttle plate with a perforated edge to a more closed position and, responsive to the adjusting the hollow throttle plate to the more closed position, adjusting an engine operating parameter; and
generating vacuum via intake airflow past the perforated edge of the hollow throttle plate.

2. The method of claim 1, wherein adjusting the hollow throttle plate to the more closed position includes creating a constricted passage between an inside edge of an intake conduit of the engine in which the hollow throttle plate is positioned and the perforated edge of the hollow throttle plate, wherein generating vacuum via intake airflow past the perforated edge includes generating vacuum via intake airflow through the constricted passage, and further comprising applying the generated vacuum to a vacuum consumption device fluidly coupled to the hollow throttle plate via a hollow shaft, the vacuum consumption device including a brake booster.

3. The method of claim 2, further comprising, during the applying of generated vacuum, flowing air from the vacuum consumption device through perforations of the perforated edge of the hollow throttle plate into the intake airflow past the perforated edge.

4. The method of claim 3, wherein the hollow throttle plate is moved towards the more closed position as the vacuum demand of the vacuum consumption device increases; and
wherein adjusting the hollow throttle plate to the more closed position is further responsive to determining that engine conditions permit a more closed throttle position, where if it is determined that engine conditions do not permit the more closed throttle position, the hollow throttle plate is not moved to the more closed position.

5. The method of claim 4, wherein adjusting the engine operating parameter is performed to maintain engine torque output as the hollow throttle plate is moved toward the more closed position; and
wherein determining that engine conditions permit the more closed throttle position is based on one or more of an engine speed and an acceleration.

6. The method of claim 5, wherein the engine is a turbocharged engine including a turbocharger and a boost chamber arranged downstream of a compressor of the turbocharger, where the hollow throttle plate controls intake airflow from the boost chamber to an intake manifold of the engine, wherein the engine operating parameter includes boost pressure of the boost chamber, the boost pressure supplied by the turbocharger, and wherein the adjusting includes increasing boost pressure as the hollow throttle plate is moved towards the more closed position.

7. The method of claim 6, wherein increasing boost pressure includes reducing an opening of a wastegate coupled across an exhaust turbine of the turbocharger.

8. The method of claim 5, wherein the engine operating parameter includes exhaust gas recirculation (EGR), and wherein the adjusting includes decreasing a rate of EGR as the hollow throttle plate is moved towards the more closed position.

9. The method of claim 5, wherein the engine operating parameter comprises intake valve timing, and wherein the adjusting includes increasing a duration of intake valve opening as the hollow throttle plate is moved towards the more closed position.

10. The method of claim 3, further comprising adjusting one or more of a fuel injection amount and fuel injection timing based on each of the intake airflow past the perforated edge and the air flowing from the vacuum consumption device through the hollow throttle plate into the intake airflow to maintain engine combustion at or around stoichiometry.

11. A system comprising:
an engine including an intake conduit;
a hollow throttle plate mounted on a hollow shaft positioned in the intake conduit, the hollow throttle plate having a plurality of perforations along its circumference, the perforations being located on both a top edge and a bottom edge of the hollow throttle plate, where the top edge and the bottom edge are arranged on opposite sides of a rotational axis of the hollow throttle plate; and
a controller with computer-readable instructions stored in non-transitory memory for:
in response to an increase in vacuum demand, adjusting a position of the hollow throttle plate to a more closed position to generate vacuum at the hollow throttle plate as intake air flows past the perforated top and bottom edges of the hollow throttle plate and through a constricted passage created between each of the perforated top and bottom edges and an inside surface of the intake conduit.

12. The system of claim 11, further comprising a vacuum consumption device, wherein the hollow shaft of the hollow throttle plate is fluidly coupled to the vacuum consumption device, and wherein the controller includes further instructions for applying the generated vacuum to the vacuum consumption device; and
wherein the perforations located on the top edge of the hollow throttle plate are diametrically opposed to the perforations located on the bottom edge of the hollow throttle plate and wherein, when the position of the hollow throttle plate is adjusted to the more closed position, a first constricted passage is formed between the top edge and a top edge of the inside surface of the intake conduit and a second constricted passage is formed between the bottom edge and a bottom edge of the inside surface of the intake conduit.

13. A system comprising:
an engine including an intake;
a hollow throttle plate mounted on a hollow shaft positioned in the intake, the hollow throttle plate having a plurality of perforations along its circumference, the perforations being located on both a top edge and a bottom edge of the hollow throttle plate, where the perforations located on the top edge of the hollow throttle plate are diametrically opposed to the perforations located on the bottom edge of the hollow throttle plate;
a vacuum consumption device, wherein the hollow shaft of the hollow throttle plate is fluidly coupled to the vacuum consumption device; and
a controller with computer-readable instructions stored in non-transitory memory for:
in response to vacuum demand, adjusting a position of the hollow throttle plate to generate vacuum at the hollow throttle plate as intake air flows past the perforated edges, wherein the adjusting is in response to a vacuum demand of the vacuum consumption device, the controller configured to move the hollow throttle plate towards a more closed position to increase vacuum generation at the hollow throttle plate as the vacuum demand of the vacuum consumption device increases; and
applying the generated vacuum to the vacuum consumption device.

14. The system of claim 13, wherein applying the vacuum to the vacuum consumption device includes flowing air from the vacuum consumption device, through the hollow shaft into the hollow throttle plate, and then into the intake via the perforations of the perforated edges; and
wherein the controller is further configured to, in response to the hollow throttle plate moving to the more closed position, adjust an operating parameter to maintain an engine torque output.

15. A method for an engine, comprising:
connecting a vacuum consumption device via a hollow shaft to a hollow throttle plate positioned in an intake passage, a periphery of the hollow throttle plate, along a circumference of the hollow throttle plate, configured with multiple perforations;
responsive to the vacuum consumption device demanding increased vacuum, determining whether engine conditions permit a change in throttle position toward a more closed position where intake airflow to the engine is reduced; and
responsive to determining that engine conditions permit the change in throttle position toward the more closed position, decreasing an opening of the hollow throttle plate to create a constriction between the perforated periphery of the hollow throttle plate and an inside edge of the intake passage and increase vacuum production at the periphery of the hollow throttle plate.

16. The method of claim 15, wherein the vacuum consumption device is one of a brake booster, a fuel vapor canister, and a vacuum actuated valve, and wherein determining that engine conditions permit the change in throttle position comprises determining that an engine speed is below a threshold.

17. The method of claim 16, wherein the engine is a turbocharged engine including a turbocharger adapted to adjust boost pressure of a boost chamber of the intake passage in which the hollow throttle plate is positioned, and further comprising increasing the boost pressure responsive to the decreasing to maintain an engine torque output, the boost pressure increased by increasing a closing of a wastegate coupled across an exhaust turbine of the turbocharger.

18. The method of claim 16, further comprising reducing flow of exhaust residuals from an engine exhaust to the intake passage in response to decreasing the opening of the hollow throttle plate to maintain an engine torque output.

19. The method of claim 16, further comprising adjusting one or more of a fuel injection amount and a fuel injection timing responsive to the decreasing to maintain engine combustion at stoichiometry.

20. The method of claim 15, wherein the perforations are located on both a top edge and a bottom edge of the hollow throttle plate, the perforations located on the top edge being diametrically opposed to the perforations located on the bottom edge, the perforations located on the top edge arranged on an opposite side of a rotational axis of the hollow throttle plate than the perforations located on the bottom edge.

* * * * *